(12) United States Patent
Pani

(10) Patent No.: US 9,374,294 B1
(45) Date of Patent: Jun. 21, 2016

(54) ON-DEMAND LEARNING IN OVERLAY NETWORKS

(71) Applicant: Cisco Technology, Inc., San Jose, CA (US)

(72) Inventor: Ayaskant Pani, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 204 days.

(21) Appl. No.: 14/290,151

(22) Filed: May 29, 2014

Related U.S. Application Data

(60) Provisional application No. 61/900,359, filed on Nov. 5, 2013.

(51) Int. Cl.
  *H04L 12/28* (2006.01)
  *H04L 12/751* (2013.01)
(52) U.S. Cl.
  CPC .................................... *H04L 45/02* (2013.01)
(58) Field of Classification Search
  None
  See application file for complete search history.

(56) References Cited

U.S. PATENT DOCUMENTS

| | | | | |
|---|---|---|---|---|
| 6,456,624 B1 * | 9/2002 | Eccles | ..................... | H04L 49/25 370/360 |
| 7,826,400 B2 * | 11/2010 | Sakauchi | .............. | H04L 12/437 370/258 |
| 7,848,340 B2 * | 12/2010 | Sakauchi | ................ | H04L 12/42 370/222 |
| 2003/0067912 A1 * | 4/2003 | Mead | ................ | H04L 29/12018 370/389 |
| 2006/0274647 A1 * | 12/2006 | Wang | ..................... | H04L 45/00 370/216 |

* cited by examiner

*Primary Examiner* — Steven H Nguyen
(74) *Attorney, Agent, or Firm* — Polsinelli PC

(57) ABSTRACT

Systems, methods, and non-transitory computer-readable storage media for on-demand learning of routing information. The system receives a first packet directed to an endpoint device in a network, the first packet including a destination address associated with the endpoint device. Next, the system determines that the destination address does not have an associated network node identified in a routing table, and lists the destination address in a pending learning cache table to yield a pending learning entry. Based on the pending learning entry, the system then modifies the routing table to identify a network address of the associated network node for the destination address, wherein modifying the routing table is performed in response to receiving a second packet from the endpoint device, and wherein the network address of the associated network node is identified based on the second packet.

20 Claims, 9 Drawing Sheets

ON-DEMAND LEARNING IN OVERLAY NETWORKS

RELATED APPLICATIONS

This application claims priority to U.S. Provisional Patent Application No. 61/900,359, filed on Nov. 5, 2013, the content of which is incorporated herein by reference in its entirety.

TECHNICAL FIELD

The present technology pertains to overlay networks, and more specifically pertains to on-demand learning of routing information in overlay networks.

BACKGROUND

The soaring demand for network data throughout the globe has steadily fueled the evolution of networking technologies, as engineers and manufacturers rush to keep pace with the changing data consumption landscape and increasing network scalability requirements. Various network technologies have been developed precisely to meet this soaring demand for network data. For example, overlay network solutions, such as virtual extensible local area networks (VXLANs), as well as virtualization and cloud computing technologies, have been widely implemented in networks with increasing success as popular solutions to such growing demands for network data.

Overlay solutions allow virtual networks to be created and layered over a physical network infrastructure. Accordingly, overlay networks allow network administrators to significantly expand their current physical network infrastructure through the use of such virtual networks. Overlay networks can also provide logical network isolation, which allows a data center or provider to host a large number of customers (also known as "tenants") while providing each customer their own isolated network domain. Not surprisingly, overlay networks are very popular in large-scale network operations, such as network-based service providers, particularly because overlay networks are highly scalable, and capable of serving vast amounts of customers in a logically isolated fashion.

Typically, such large-scale operations involve massive amounts of traffic data constantly being routed through the various nodes and devices in the network. As the amount of traffic handled by the network grows, it becomes increasingly important to efficiently route such traffic: poor routing strategies can create an enormous burden on the network, which only worsens as the amount of traffic grows. Efficient routing can be accomplished, in part, by identifying routing information needed to route traffic, such as endpoint-to-switch bindings or mappings in a forwarding table. This way, nodes can quickly lookup precisely where traffic needs to be directed rather than broadcasting the traffic on the network or otherwise forwarding the traffic to unnecessary devices.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
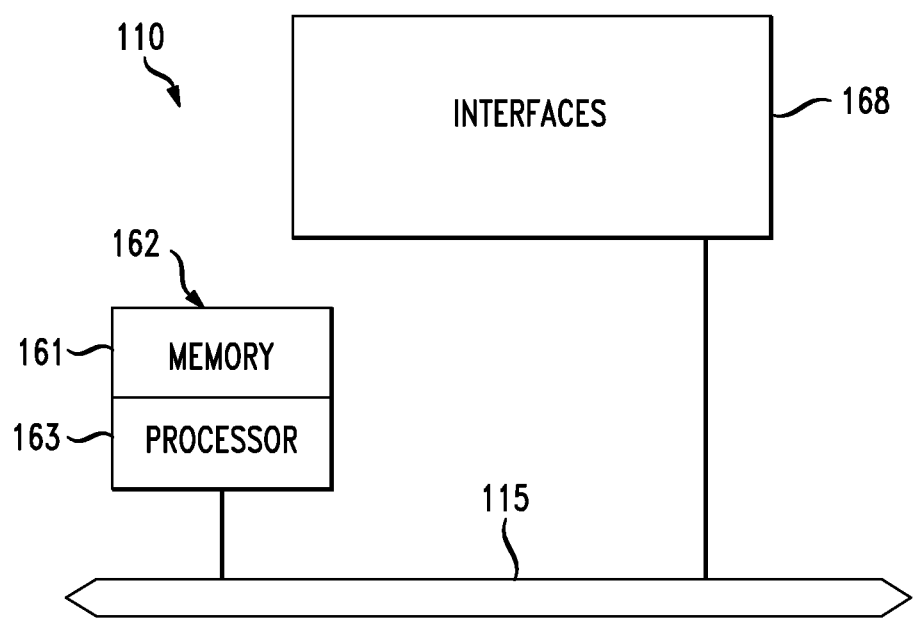
FIG. 1 illustrates an example network device, according to some aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Without an accurate list of routing information, network devices are often required to flood the network with broadcast or multicast messages when routing traffic, which can significantly degrade network performance or even cripple the network. On the other hand, maintaining a comprehensive list of routing information for all addresses can be an extremely wasteful proposition, since many times, numerous addresses in the network are never actually used by a device in routing traffic and are therefore unnecessary. To this end, it is advantageous to intelligently learn and maintain routing information in a network. Unfortunately, however, current solutions of VXLAN networks lack the ability to intelligently perform efficient, on-demand learning of routing information of interest.

The approaches set forth herein can be implemented to address the foregoing limitations, for example, by performing on-demand learning of routing information in an overlay network, such as a VXLAN network. Specifically, these approaches can be used to create and maintain an endpoint or tenant lookup table in an overlay network. The lookup table can be a forwarding table with endpoint-to-switch bindings or mappings. Moreover, the lookup table can be limited to selected endpoints or tenants of interest, and can avoid unnecessary entries. The unnecessary entries can refer to, for example, entries of endpoints that have not been used in a communication within a specific period of time, endpoints that are not likely to be used in future communications, endpoints that have not been the intended recipients of prior or current communications, etc.

An entry (i.e., a mapping or binding of an endpoint to a switch or network device) can be learned, stored, ignored, or removed from a lookup or cache table based on a threshold probability of future use. For example, an entry having a probability of future use below the predetermined threshold can be ignored or removed from the table of entries (if already present), and an entry having a probability of future use above the threshold can be learned and/or stored in the table of entries for future use. This can ensure that, as the table of entries is updated, necessary or useful entries are not replaced with unnecessary entries or entries that are otherwise not useful to the future routing of traffic.

In certain implementations, the probability of future use of an entry can be calculated based on one or more factors, such as whether an associated endpoint has been an intended target of a communication; whether the associated endpoint has responded to a previous communication; whether the associated endpoint is expected to receive future communications; whether the associated endpoint has exhibited a threshold level of communication activity; whether the associated endpoint has been associated with a multicast, broadcast, or unicast communication; etc.

In addition, these approaches can reduce the amount of processing and storage by reducing the number of entries in the table of entries, as the entries learned or stored can be limited to selected entries of interest, for example, as previously mentioned. Thus, the size of the lookup table can be reduced and further avoid inclusion of unnecessary, redundant, or scarcely used information.

Disclosed are systems, methods, and non-transitory computer-readable storage media for on-demand learning of routing information. As follows, a method of the subject technology is described with respect to a system performing steps for on-demand learning. The system can receive communications addressed to endpoints in an overlay network and, based on the communications, learn endpoint-to-node bindings for selected endpoints of interest from the endpoints in the overlay network. The system can then store the endpoint-to-node bindings in a routing table. The system can use the endpoint-to-node bindings in the routing table to route future communications directly according to the learned routing information (i.e., endpoint-to-node bindings).

The endpoint-to-node bindings can include, for example, endpoint-to-switch mappings in the overlay network. In some cases, the switch in the endpoint-to-switch mappings can be a top-of-rack (TOR) switch or a VXLAN tunnel end point (VTEP). Moreover, the endpoint can refer to any communication device in the network, such as a client device, a mobile device, a tablet computer, a set-top box, a gaming system, etc. Further, the overlay network can be based on any network overlay solution, such as VXLAN, a network virtualization using generic routing encapsulation (NVGRE), Stateless Transport Tunneling (STT), etc.

To learn the endpoint-to-node bindings, the system can create a pending learning cache entry in the routing table for each destination address that does not already have an endpoint-to-node binding in the table. Based on the pending learning cache entry, the system can then identify the address of the respective node associated with each destination address. Here, the respective node address can be identified from a received communication that originated from the destination address. For example, the system can receive a communication from the destination address, check the routing table and/or a separate pending learning cache table to determine that a learning of the endpoint-to-node binding of the destination address is pending, and extract the node information from the communication to create the endpoint-to-node binding for that destination address.

In some implementations, the system can check the packet received for the communication originating from the destination address, and extract the destination address from the packet in order to compare the address with the pending learning entries, and further extract the address of the node attached to that particular destination address to ascertain which address should be mapped to that destination address in the routing table. Moreover, the communication received from the destination address can be a reply message generated by the destination address in response to a message previously sent to the destination address by another endpoint.

As previously mentioned, the system can learn the endpoint-to-node bindings for selected endpoints of interest. This can allow the system to avoid learning unnecessary bindings, such as bindings associated with endpoints that are not expected to be involved in future communications. If an endpoint is not expected to be involved in a future communication, it is unlikely that future traffic will need to be specifically directed to that endpoint and, therefore, it is also unlikely that a binding for that endpoint will be necessary to route future communications. Thus, learning or storing a binding for such an endpoint may be wasteful in the sense that doing so would require additional processing and resources, while learning or storing such information may not yield any significant performance benefit that would justify the additional expenditure of processing and resources.

The selected endpoints of interest can include endpoints that are expected to be involved in one or more future communications. To this end, the selected endpoints can be identified based on a threshold probability of involvement in a future communication or a determination that a reply to a previous communication has been received from the selected endpoints of interest. In some cases, the system can identify endpoints that have been previously involved in communications routed by the system. However, the system can also filter out or ignore endpoints involved in broadcast or multicast communications which were not the intended targets of those communications. Here, the system can analyze such previous communications to identify the destination address of such communications, and therefore identify the intended target of those communications based on the destination address indicated in the communications. The system can also identify a reply from an endpoint to a previous communication from another endpoint, and determine that the endpoint was the intended target of the previous communications based on the reply communication likely being triggered by the previous communication.

In other words, the learning can be performed for the source endpoint of the second packet, which corresponds to either a response packet or any broadcast/multicast packet sourced by the source endpoint. The source endpoint of the second packet is the destination of the original packet (first packet) for which a pending learning entry was created.

On the other hand, any endpoint included in a broadcast or multicast communication that does not reply to such communication is likely an irrelevant and unintended target of the communication. Accordingly, the system can avoid or ignore learning or storing the bindings for such unintended and uninteresting endpoints.

In some embodiments, the system can also remove endpoint-to-node bindings from the routing table to avoid unnecessary bindings. For example, the system can remove stale bindings and/or bindings that have less than a threshold probability of use in a future communication. Thus, the system can remove any bindings that are older than a threshold age, or any bindings that the system has determined it will likely not need to route traffic to.

Description

A computer network is a geographically distributed collection of nodes interconnected by communication links and segments for transporting data between endpoints, such as personal computers and workstations. Many types of networks are available, with the types ranging from local area networks (LANs) to wide area networks (WANs) and virtual extensible local area networks (VXLANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. Moreover, VXLANs generally allow virtual networks to be created and layered over a physical network infrastructure.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Cloud computing can generally include Internet-based computing in which computing resources are dynamically provisioned and allocated to client or user computers or other devices on-demand from a collection of resources available via the network (e.g., "the cloud"). Cloud computing resources, for example, can include any type of resource such as computing, storage, and network devices, virtual machines (VMs), etc. For instance, resources may include service devices (firewalls, deep packet inspectors, traffic monitors, etc.), compute/processing devices (servers, CPU's, memory, brute force processing capability), storage devices (e.g., network attached storages, storage area network devices), etc., and may be used to support virtual networks, virtual machines (VM), databases, applications (Apps), etc.

Cloud computing resources may include a "private cloud," a "public cloud," and/or a "hybrid cloud." A "hybrid cloud" is a cloud infrastructure composed of two or more clouds that inter-operate or federate through technology. In essence, a hybrid cloud is an interaction between private and public clouds where a private cloud joins a public cloud and utilizes public cloud resources in a secure and scalable way. Cloud computing resources can also be provisioned via virtual networks in an overlay network, such as a VXLAN.

Network virtualization allows multiple numbers of VMs to be attached to the network via respective virtual LANs (VLANs). The VMs can be grouped according to their respective VLAN.

VXLAN provides a traffic encapsulation scheme which allows network traffic to be carried across layer 2 (L2) and layer 3 (L3) networks over a logical tunnel. Such VXLAN tunnels can be originated and terminated through VXLAN tunnel end points (VTEPs). Moreover, VXLANs can include VXLAN segments, which can include VXLAN L2 and/or L3 overlay networks over which VMs communicate. The VXLAN segments can be identified through a VXLAN network identifier (VNI), which can specifically identify an associated VXLAN segment.

The disclosed technology addresses the need in the art for intelligent and efficient on-demand learning schemes in networks, such as overlay networks. Disclosed are systems, methods, and computer-readable storage media for on-demand learning of routing information in overlay networks. A brief introductory description of exemplary systems and networks, as illustrated in FIGS. 1 through 4, is disclosed herein. A detailed description of on-demand learning of routing information, related concepts, and exemplary variations, will then follow. These variations shall be described herein as the various embodiments are set forth. The disclosure now turns to FIG. 1.

FIG. 1 illustrates an exemplary network device 110 suitable for implementing the present invention. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such as miscabling detection functions, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the router 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2:
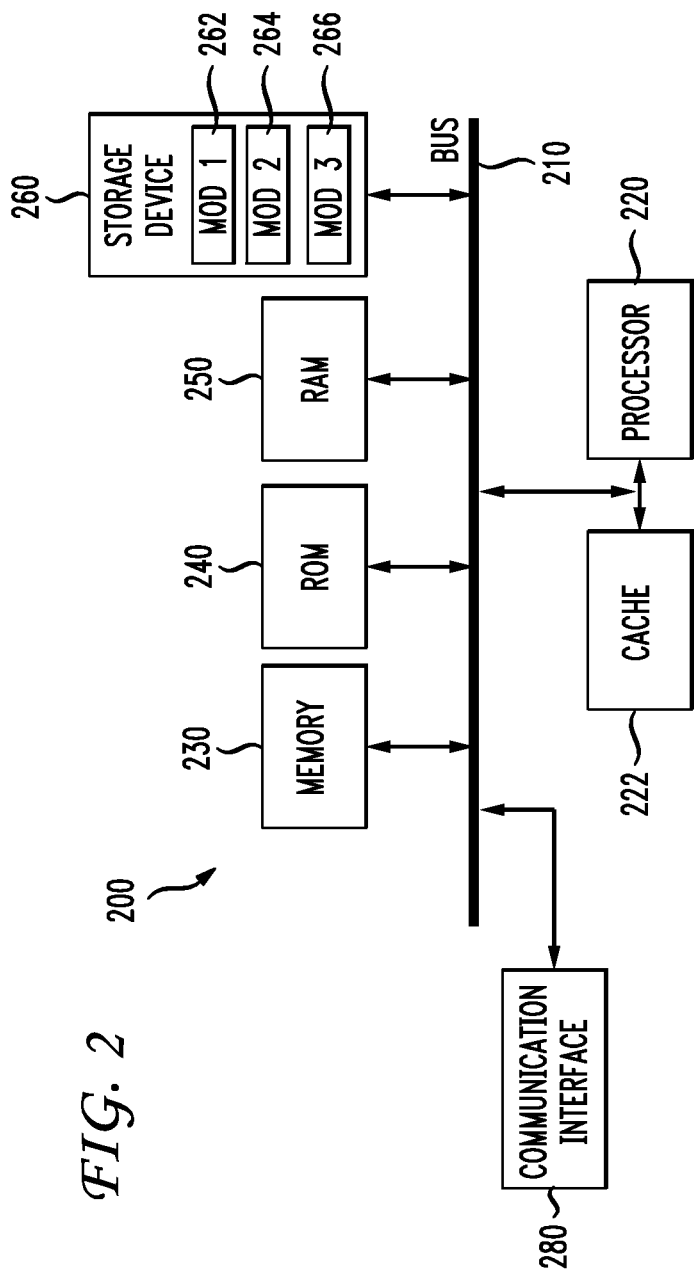
FIG. 2 illustrates an example system embodiment.

FIG. 2 illustrates exemplary possible system embodiments, such a system making up network device 110. The more appropriate embodiment will be apparent to those of ordinary skill in the art when practicing the present technology. Persons of ordinary skill in the art will also readily appreciate that other system embodiments are possible.

FIG. 2 illustrates an example computing system architecture 200 wherein the components of the system 200 are in electrical communication with each other using a bus 205. System 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions.

Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of non-transitory computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof. The storage device 230 can include computer code and instructions which can be executed by one or more processors to perform one or more operations according to the code and instructions. For example, the non-transitory computer readable media can store instructions which, when executed by a processor, causes the processor to perform operations defined in the instructions.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

Figure 3:
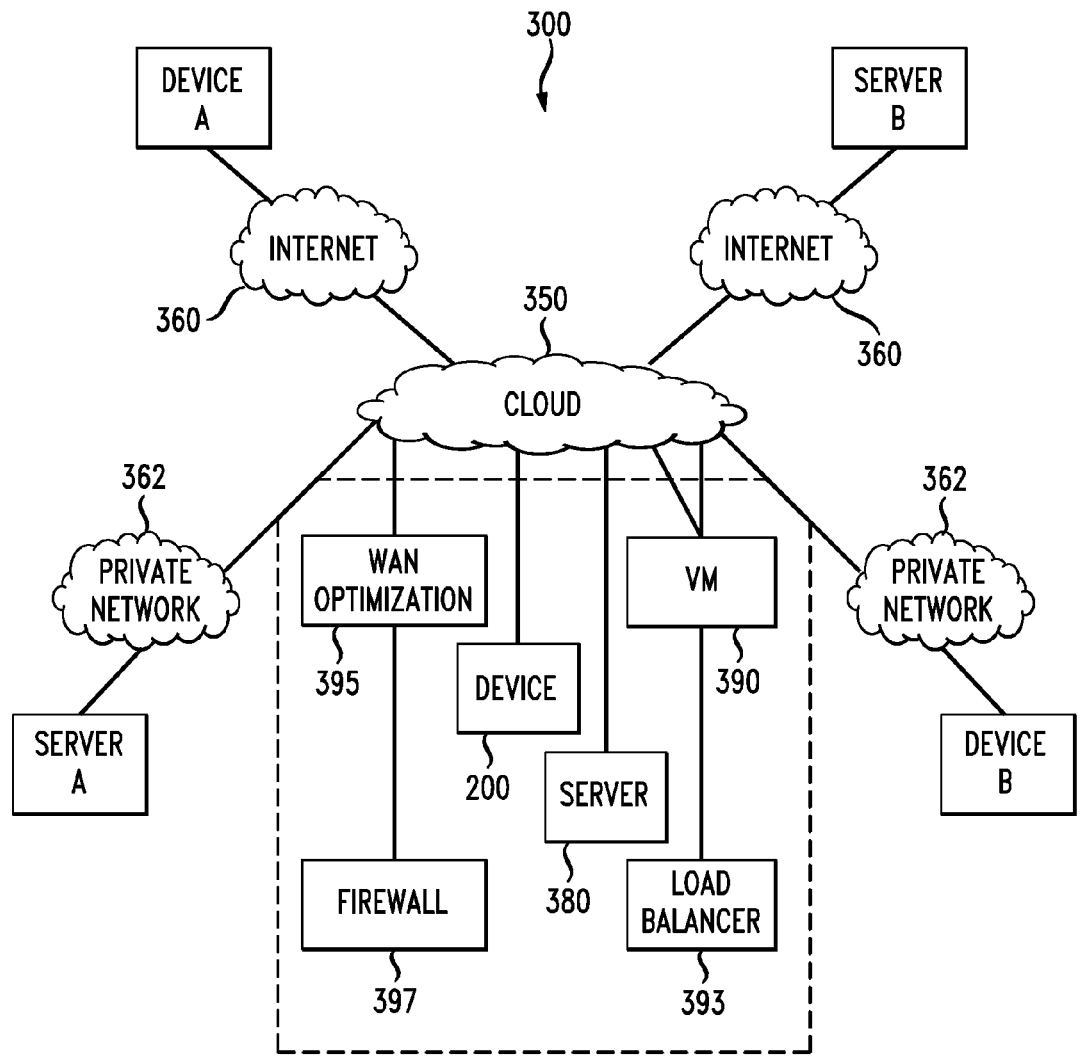
FIG. 3 illustrates a schematic block diagram of an example computer network including nodes/devices interconnected by various methods of communication.

FIG. 3 illustrates a schematic block diagram of an example computer network 300 illustratively including nodes/devices interconnected by various methods of communication. For instance, links may be wired links or shared media (e.g., wireless links, etc.) where certain nodes may be in communication with other nodes based on physical connection, or else based on distance, signal strength, current operational status, location, etc. Those skilled in the art will understand that any number of nodes, devices, links, etc. may be used in the computer network, and that the view shown herein is for simplicity.

Specifically, devices "A" and "B" may include any device with processing and/or storage capability, such as personal computers, mobile phones (e.g., smartphones), gaming systems, portable personal computers (e.g., laptops, tablets, etc.), set-top boxes, televisions, vehicles, etc., and may communicate with the network 360 (internet or private networks) to cloud 350. In addition, one or more servers (Server A and B), network management servers (NMSs), control centers, etc., may also be interconnected with (or located within) the network 360 to cloud 350.

Cloud 350 may be a public, private, and/or hybrid cloud system. In some embodiments, cloud 350 can also include a VXLAN overlay network, such as VXLAN 400 illustrated in FIG. 4, below. Moreover, cloud 350 includes resources such as Firewalls 397, Load Balancers 393, WAN optimization platform(s) 395, device(s) 200, server(s) 380, and virtual machine(s) (VMs) 390. The cloud resource may be a combination of physical and virtual resources. The cloud resources are provisioned based on requests from one or more clients. Clients may be one or more devices, for example device A and/or B, or one or more servers, for example server A and/or B.

Data packets (e.g., traffic and/or messages) may be exchanged among the nodes/devices of the computer network 300 using predefined network communication protocols, such as certain known wired protocols, wireless protocols or other protocols where appropriate. In this context, a protocol can refer to a set of rules defining how the nodes interact with each other.

Figure 4:
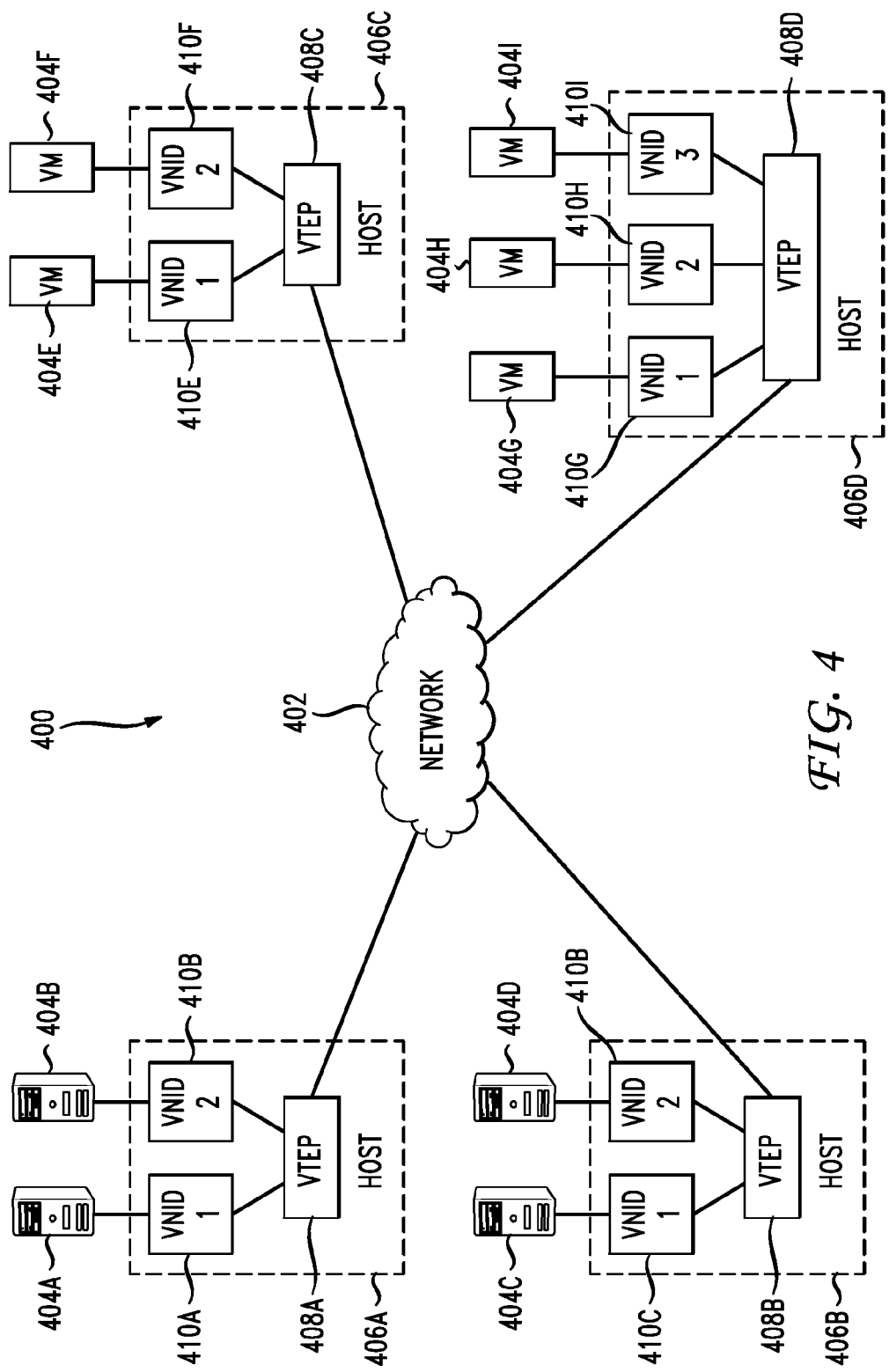
FIG. 4 illustrates an example virtual extensible local area network.

FIG. 4 illustrates an exemplary VXLAN 400. VXLAN 400 uses a VXLAN overlay protocol to encapsulate traffic in L2 and/or L3 packets which can cross overlay L3 boundaries in the network. While VXLAN 400 is illustrated herein as a VXLAN protocol overlay network, one of ordinary skill in the art will readily recognize that the concepts contemplated herein are similarly applicable to other overlay protocols, including NVGRE, STT, and even overlay protocols yet to be invented.

As illustrated in FIG. 4, VXLAN 400 can include hosts 406A-D interconnected via network 402. Network 402 can include any packet network, such as an IP network, for example. Moreover, hosts 406A-D include VXLAN tunnel end points (VTEP) 408A-D, which can be virtual nodes or switches configured to encapsulate and de-encapsulate data traffic, as further described below in FIG. 5, for the various VXLAN network identifiers (VNIDs) 410A-I.

The VNIDs can represent the segregated virtual networks in VXLAN 400. Each of the overlay tunnels (VTEP 408A-D) can include one or more VNIDs. For example, VTEP 408A can include VNIDs 1 and 2, VTEP 408B can include VNIDs 1 and 3, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in VXLAN 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Endpoints and VMs 404A-I can connect to their respective VNID or VXLAN segment, and communicate with other endpoints or VMs residing in the same VNID or VXLAN segment. For example, endpoint 404A can communicate with endpoint 404C and VMs 404E, G because they all reside in the same VNID, namely, VNID 1. Similarly, endpoint 404B can communicate with VMs 404F, H because they all reside in VNID 2.

Figure 5:
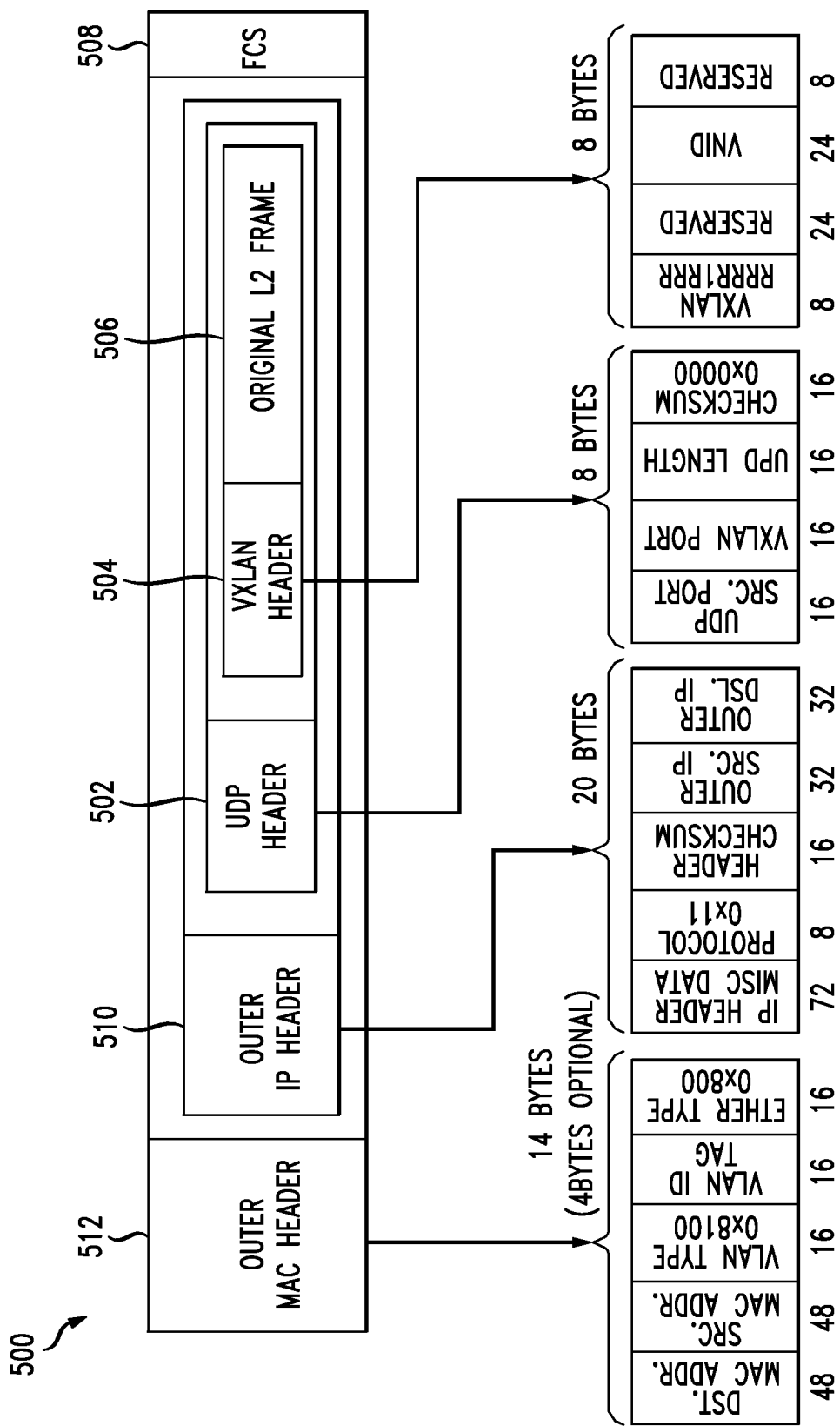
FIG. 5 illustrates an example virtual extensible local area network packet.

VTEPs 408A-D can encapsulate packets, as illustrated in FIG. 5, directed at the various VNIDs 1-3 in the VXLAN 400, so traffic can be properly transmitted to the correct VNID and recipient(s). Moreover, when a switch, router, or other network device receives a packet to be transmitted to a recipient in the VXLAN 400, it can analyze a routing table, such as a lookup table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H. Optionally it can use a proxy forwarding mode such as another proxy device assisting in forwarding of the packet to destination endpoint. Unfortunately, this process can be onerous, particularly in larger networks. Accordingly, in some cases, VTEP 408A can perform on-demand learning, as further explained below, to learn the mappings or bindings of endpoint 404H and its corresponding switch or network device, for future use. For example, after determining that the routing table does not include a mapping or binding for endpoint 404H, VTEP 408A can create a pending learning entry to indicate that a learning of such mapping or binding is pending. At this time, VTEP 408A can also create a pending learning cache table, for example, to maintain a list of bindings or mappings it expects or wishes to learn.

If endpoint 404H later transmits a message to endpoint 404B, such as a response to the original message contained in the packet transmitted by VTEP 408 from endpoint 404B, VTEP 408A can receive the message from endpoint 404B and extract information, such as an IP or MAC address of the device and the IP or MAC address of the network device (e.g., VTEP 408D) associated with the endpoint 404H, from the packet transmitted by endpoint 404H, to create a binding or mapping in the routing table. This way the VTEP can learn the routing information (i.e., mappings and bindings) as needed, through on-demand learning. Further, this learning can be triggered by a detection of a pending learning entry in the routing table and/or an indication in the pending learning cache table.

In some cases, the routing table can be dynamically and continuously modified by removing unnecessary or stale entries and learning new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations. Further explanations and examples of on-demand learning will be described in the following portions of the disclosure, without limitation.

FIG. 5 illustrates an exemplary virtual extensible local area network packet 500. As previously mentioned, the VXLAN packet 500 can be used to route traffic in a overlay networks, such as VXLAN 400 illustrated in FIG. 4. In particular, VXLAN packet 500 can use MAC Address-in-User Datagram Protocol (MAC-in-UDP) encapsulation to allow a L2 segments to be extended across the network. This allows for a flexible, large-scale multitenant environment, implemented over a shared common physical infrastructure. With MAC-in-UDP encapsulation, VXLAN can tunnels L2 network over L3 network. Moreover, the transport protocol over the physical network can include IP plus UDP. The example format of VXLAN packet 500 is illustrated in FIG. 5 and further described below.

VXLAN packet 500 can include a frame check sequence (FCS) 508 for error detection. VXLAN packet 500 also includes an L2 frame 506 encapsulated with a VXLAN header 504. VXLAN header 504 can include an associated VNID of a corresponding VXLAN segment, VXLAN flags, and a reserved field. VXLAN header 504 can be used to route the packet through the VXLAN and ensure that traffic from different VXLAN segments is segregated. A network device, such as a gateway or switch, can obtain the VXLAN packet 500 and use the VXLAN header 504 to determine which VNID the packet belongs to.

VXLAN packet 500 can also include a user datagram protocol (UDP) header 502. The UDP header 502 can include a source port, which can be set by the transmitting VTEP, a VXLAN port, a UDP length, and a UDP checksum for error detection.

Furthermore, VXLAN packet 500 can include an outer IP header 510, which can include a field for miscellaneous data, a protocol associated with the frame, a source IP address, and a destination IP address. The source IP address corresponds to the IP address of the originating VTEP, and the destination IP address corresponds to the IP address of the receiving or targeted VTEP. If the destination IP address is not known when transmitting the VXLAN packet 500, the originating VTEP can perform an on-demand learning process as described herein. To this end, the originating VTEP can determine that the receiving or targeted VTEP is not known, and consequently create a pending learning entry in the routing table. In some embodiments, the originating VTEP can also create an entry in a pending learning cache table, which the VTEP can analyze when it receives packets to determine if address information (e.g., originating IP address and/or originating MAC address) must be learned from the received packet.

Moreover, if the destination IP address is not known, this field can be replaced or populated with an IP multicast or broadcast group. As a result, all of the VTEPs in the IP multicast or broadcast group will receive the frame and further decapsulate it. The host VTEP from the receiving VTEPs in the group can then forward the frame to the destination endpoint, residing in the network of the host VTEP. If the destination endpoint later sends a message to the originating VTEP, such as a reply, the originating VTEP can then decapsulate the packet and learn the address information of the destination endpoint and the host VTEP (i.e., the VTEP attached to the destination endpoint), and update the routing table with the learned routing information. Here, the VTEP can update the routing table to replace the pending learning entry with the actual mapping or binding for the destination endpoint. In some cases, the VTEP can also update the pending learning cache table to remove the destination endpoint from that table, as the VTEP no longer needs to learn a mapping or binding for such endpoint, and thus it is unnecessary for the destination endpoint to remain in the pending learning cache table.

VXLAN packet 500 can also include an outer MAC header 512. The MAC header 512 can include a destination MAC address, which corresponds to the MAC address of the destination VTEP. If unknown, the MAC destination address can be learned in a similar fashion as described above with respect to the destination IP address. The MAC header 512 can also include a source MAC address, a VLAN type, a VLAN ID, and an ether type.

Figure 6:
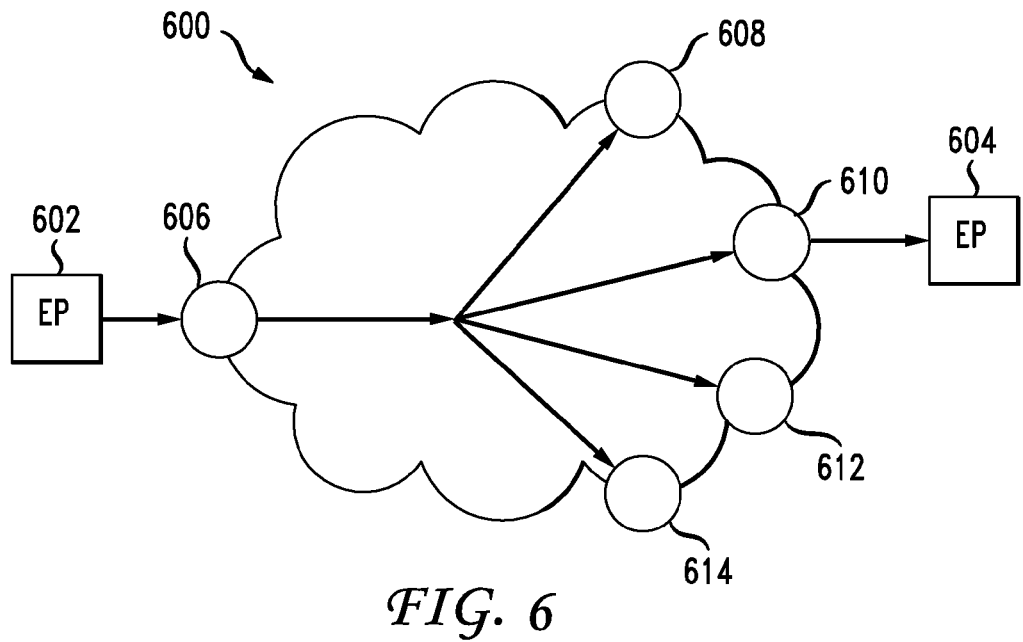
FIG. 6 illustrates an example broadcast communication mode.

Referring now to FIG. 6, an originating VTEP 606 transmitting a VXLAN packet with an unknown destination IP or MAC address can operate in a broadcast communication mode 600. For example, originating endpoint 602 can transmit a packet to originating VTEP 606, where the packet is intended for destination endpoint 604 but does not include an address associated with the destination VTEP 610. Since originating VTEP 606 is unaware of which of the VTEPs 608-614 is attached to the destination endpoint 604, it can broadcast the packet to all of the VTEPs 608-614. VTEPs 608-614 then receive the packet and decapsulate it. Those VTEPs that are not attached to the destination endpoint 604 specified in the packet can simply discard the packet, for example. When receiving the packet, destination VTEP 610 can determine that destination endpoint 604 is attached to it and subsequently deliver the packet to destination endpoint 604 in well-known fashion.

Moreover, when operating in broadcast communication mode 600, originating VTEP 606 can create a pending learning entry in the routing table, to indicate that a mapping or binding for such destination endpoint 604 may have to be learned from future communications. Here, originating VTEP 606 can extract the address associated with the destination endpoint 604 from the packet, such as the IP or MAC address of the device, and create a pending learning entry in the routing table. In some cases, originating VTEP 606 can also create an entry for destination endpoint 604 in a pending learning cache table, to indicate that a mapping or binding for destination endpoint 604 should be learned.

Figure 7:
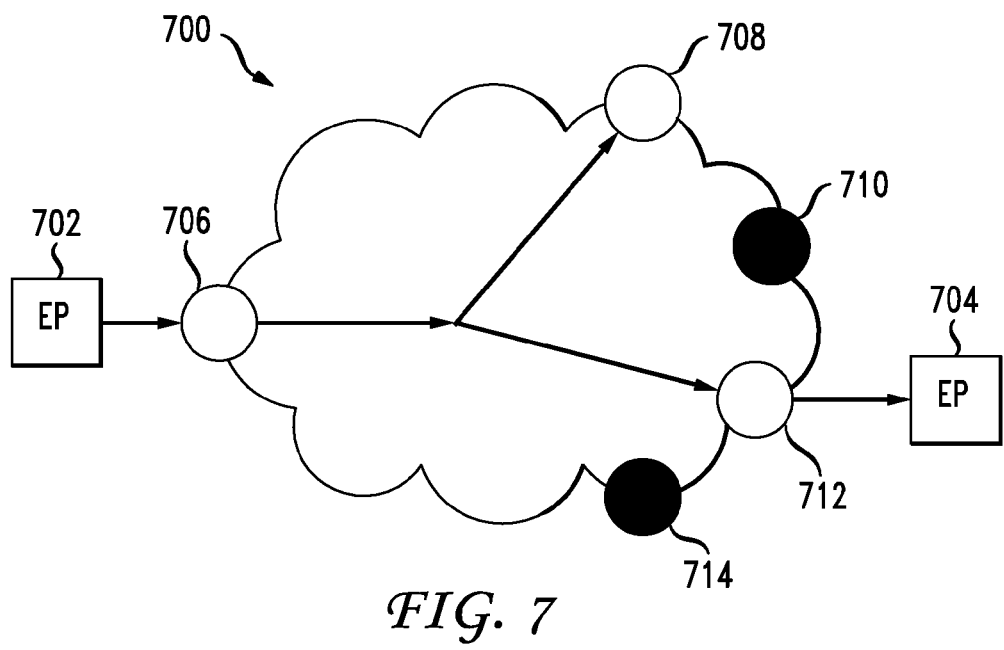
FIG. 7 illustrates an example multicast communication mode

Referring now to FIG. 7, an originating VTEP 706 transmitting a VXLAN packet with an unknown destination IP or MAC address can operate in a multicast communication mode 700. Here, originating endpoint 702 can transmit a packet to originating VTEP 706, where the packet is intended for destination endpoint 704 but does not include an address associated with the destination VTEP 712. Since originating VTEP 706 is unaware of which of the VTEPs 708-714 is attached to the destination endpoint 704, it can transmit the packet to all VTEPs subscribed to a multicast group, which in FIG. 7 include VTEPs 708 and 712 from the group of VTEPs 708-714.

Subsequently, VTEPs 708-714 can receive the packet and decapsulate it. Those VTEPs that are not attached to the destination endpoint 704 specified in the packet can simply discard the packet, forward the packet, etc. On the other hand, destination VTEP 712, which is attached to destination 704, can receive the packet and deliver it to destination endpoint 704 in well-known fashion.

When operating in multicast communication mode 700, originating VTEP 706 can similarly create a pending learning entry in the routing table, to indicate that a mapping or binding for destination endpoint 704 may have to be learned from future communications. Here, originating VTEP 706 can extract the address associated with the destination endpoint 704 from the packet, and create a pending learning entry in the routing table. In some cases, originating VTEP 706 can also create an entry for destination endpoint 704 in a pending learning cache table, to indicate that a mapping or binding for destination endpoint 704 should be learned.

Figure 8:
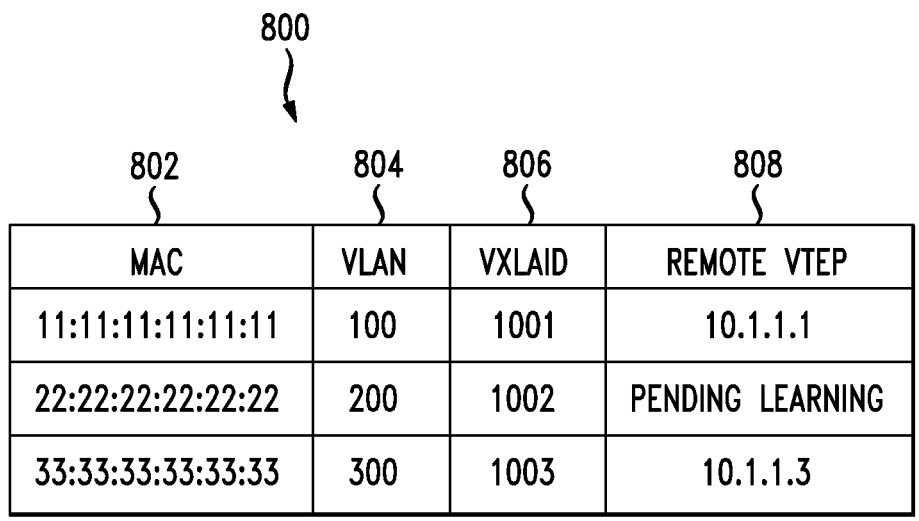
FIG. 8 illustrates an example routing table with a pending learning entry.

FIG. 8 illustrates an exemplary routing table 800 with a pending learning entry. Routing table 800 can be a forward lookup table used by network devices, such as switches, gateways, VTEPs, etc., to determine where received traffic should be forwarded to. To this end, routing table 800 can include bindings or mappings of switch-to-endpoints. This way, a network device can receive a communication destined for a particular endpoint listed in the routing table, and simply determine from the routing table 800 which network device the communication needs to be forwarded to. Thus, when receiving a packet destined for a particular endpoint, the network device can lookup the endpoint in the routing table 800 to determine where the packet needs to be forwarded for delivery to the endpoint.

As such, routing table 800 can include a MAC address 802 of endpoints, a VLAN number 804 for the particular endpoint, a VXLAN ID 806 indicating the VXLAN segment associated with the endpoint, and/or the remote VTEP address 808 for the particular endpoint.

In some embodiments, if the remote VTEP address 808 is unknown for a particular endpoint, a pending learning entry can be created to indicate that learning of such information is in process. Once the remote VTEP address 808 is learned, for example from a subsequent communication received, the pending learning entry can be replaced with the actual address of the remote VTEP. The pending learning cache entry can be included in the remote VTEP address field 808 itself, and/or in a separate field within the routing table 800. For example, in some cases, the routing table 800 can include a separate field for pending learning entries or flags can be added.

In other embodiments, if the remote VTEP address 808 is unknown for a particular endpoint, an entry, flag, or bit, for example, can be added to a pending learning cache table to indicate that learning of such information is in process. The pending learning cache table can then be updated once the remote VTEP address is learned to remove any indication in the table that would trigger such learning.

As one of ordinary skill in the art will readily recognize, the information, entries, and formatting shown in routing table 800 are for illustration purposes and can vary in different embodiments. For example, the routing table 800 can include other fields or flags, such as timestamp information, age of entries, alternate addresses, etc. The routing table 800 can also be implemented in a simplified manner where some of the fields shown in FIG. 8 are not used or included.

Figure 9:
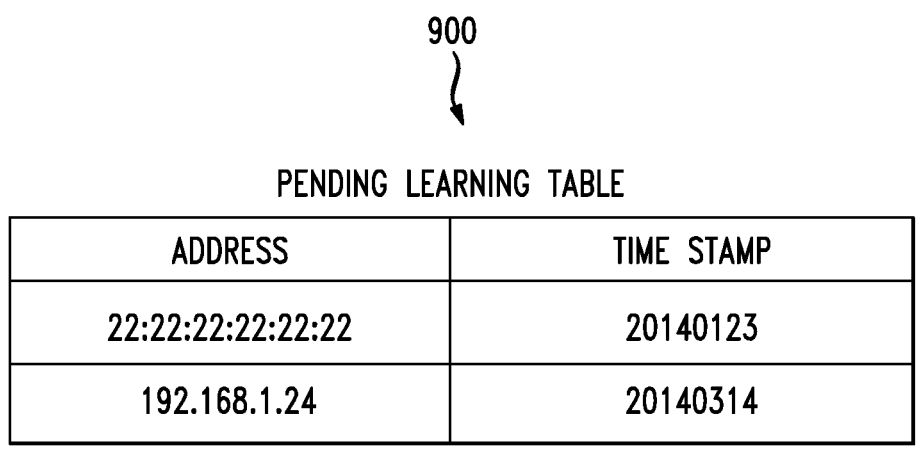
FIG. 9 illustrates an example pending learning cache table.

FIG. 9 illustrates an exemplary pending learning cache table 900. As previously mentioned, the pending learning cache table 900 can include entries indicating that a mapping or binding for an endpoint should be learned and/or is in the process of being learned. The pending learning cache table 900 can include fields, flags, comments, and/or details about the mappings that need to be learned or the relevant endpoint. For example, the pending learning cache table 900 can include an address associated with the endpoint that is missing a network device binding in the routing table 800. The address can include an IP or MAC address, for example, but can also include any other type of identifying address or number.

In some cases, each entry can also include comments, statistics, history, and/or any other relevant information. For example, an entry, which can refer to an endpoint, can include a timestamp indicating when the entry was added, a an age, a date indicating when the entry should be removed, information indicating which device added the entry or which communication triggered the entry, etc.

As one of ordinary skill in the art will readily recognize, pending learning cache table 900 can include any other additional information. The information shown in FIG. 9 are provided as a non-limiting example for illustration purposes.

Figure 10:
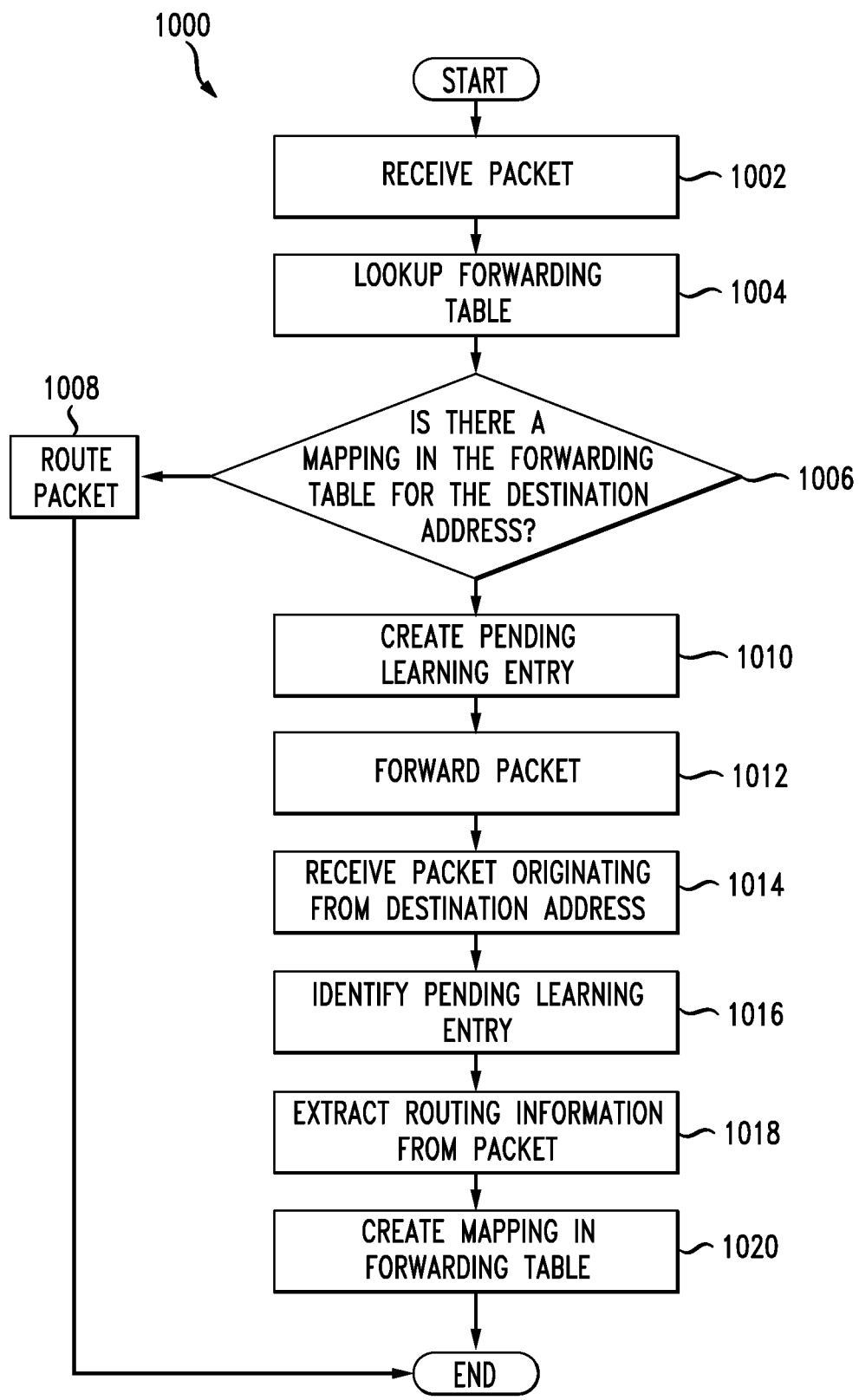
FIG. 10 illustrates an example flowchart for on-demand learning of routing information.

FIG. 10 illustrates an exemplary flowchart 1000 for on-demand learning of routing information. For the sake of clarity, the steps in the flowchart 1000 will be described in terms of a system, such as network device 110 shown in FIG. 1, performing the steps.

At step 1002, the system first receives a packet from an originating device. The system can analyze the packet to extract an address of the destination device and any additional details included in the packet, which can provide details relevant to the communication.

At step 1004, the system performs a lookup in a forwarding table to determine where the packet needs to be transmitted. The forwarding table can be any routing table, such as routing table 800, for example.

At step 1006, after performing the lookup, the system determines if the forwarding table includes a mapping for the destination device. If the forwarding table includes a mapping, the system continues to step 1008 and routes the packet according to the mapping in the forwarding table.

On the other hand, if the forwarding table does not include a mapping, the system continues to step 1010, where the system creates a pending learning entry in the forwarding table. The system can also include a timestamp indicating when the pending learning entry was created to allow old or stale entries to be deleted rather than maintained unnecessarily. Thus, if the system never receives a response or any communication from the destination device, the pending learning entry can be eventually removed.

In some embodiments, the system can also (or alternatively) create an entry in a pending learning cache table which indicates the learning is pending. The system can similarly include a timestamp and remove old or stale entries from the pending learning cache table. In some cases, entries of device addresses that are never involved in future communications can be eventually removed once the entries satisfy an age threshold.

At step 1012, the system forwards the packet. Here, the system can forward the packet using broadcast or multicast mode, as previously explained. After forwarding the packet, the host VTEP receives the packet and delivers it to the appropriate destination device.

At step 1014, the system receives a packet originating from the destination device. This packet can be a reply or response to the previous packet transmitted by the system. Or optionally this can also be a broadcast or multicast packet sourced by the endpoint (which was the destination endpoint of the first packet). Also, in some cases, since the originating address included in the packet from the destination device matches the destination address transmitted by the system from the originating device, the system can determine that a mapping for the destination device should be learned based on such previous and ongoing communications with the destination device, for example.

When the system receives the packet from the destination device, it can extract the address of the destination device, which can be included in the packet as the source address, to use the destination device address in determining if learning is pending. To this end, at step 1016, the system can analyze the forwarding table and determine if learning is pending. Here, the system searches the source device address in the forwarding table, and can determine that learning is pending based on the pending learning entry previously created in the forwarding table.

At step 1018, the system can extract routing information from the packet to create a new mapping or binding in the forwarding table. In particular, the system can extract the address of the VTEP attached to the destination device to include the VTEP address in the forwarding table for use in future communications. As such, in step 1020, the system can create a mapping in the forwarding table based on the VTEP address and the destination device address extracted from the packet. This way, any future communications addressed to the destination device can be transmitted directly to the VTEP address, which handles communications to the destination device, to avoid having to broadcast or multicast the packet and creating unnecessary traffic in the network.

Figure 11:
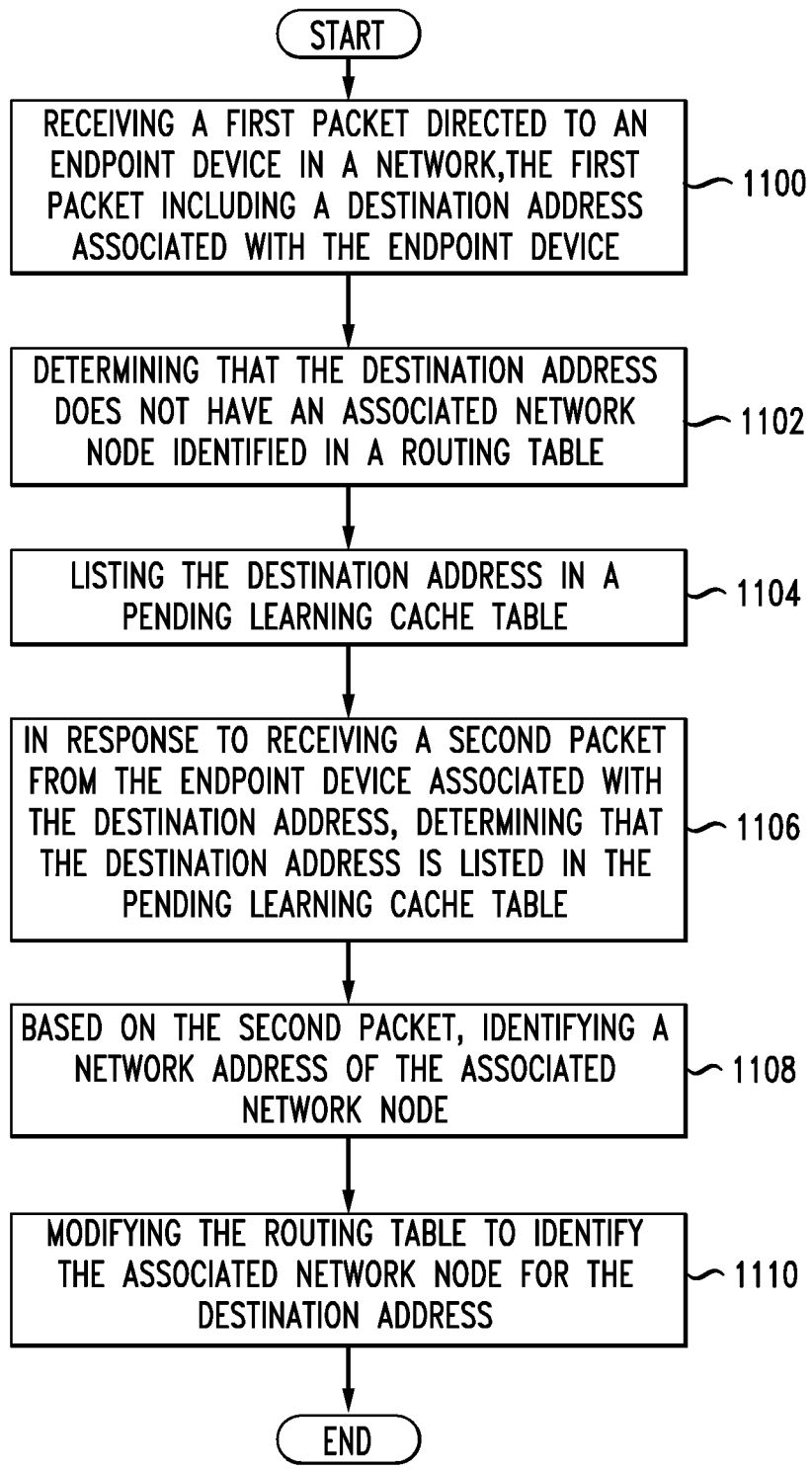
FIG. 11 illustrates an example method embodiment.

Having disclosed some basic system components and concepts, the disclosure now turns to the exemplary method embodiment shown in FIG. 11. For the sake of clarity, the method is described in terms of a system 110, as shown in FIG. 1, configured to practice the method. The steps outlined herein are exemplary and can be implemented in any combination thereof, including combinations that exclude, add, or modify certain steps.

The system 110 receives a first packet directed to an endpoint device in a network, the first packet including a destination address associated with the endpoint device (1100). The network can be a VXLAN network, such as VXLAN 400, or any other type of network. To this end, the first packet can be encapsulated with a VXLAN header, as illustrated in FIG. 5. Moreover, the first packet can be received by the system 110 from an originating endpoint or any other network device. In some embodiments, the system 110 can receive the first packet from an originating endpoint attached to the system.

Next, the system 110 determines that the destination address does not have an associated network node identified in a routing table (1102). The routing table can be any forwarding or routing table, such as routing table 800 illustrated in FIG. 8. The system 110 here can perform a lookup of the destination address in the routing table and determine that a mapping or binding does not currently exist in the routing table. In some cases, the endpoint device can reside in a different network segment, such as a different VXLAN segment, than the system 110. As such, the system 110 may not know where to forward the packet for proper delivery and therefore performs a lookup in the routing table in an attempt to identify such information. If a network node is not identified through the lookup, the system 110 can broadcast or multicast the first packet to ensure that the host network node, which is unknown to the system 110, receives the first packet for proper delivery to the endpoint.

The system 110 then lists the destination address in a pending learning cache table (1104). The system 110 can add an entry representing the destination address to the pending learning cache table to indicate that learning of a mapping or binding for that address is pending. In some cases, the addition of this entry can be triggered by the system 110 determining that a mapping or binding does not currently exist for that address in the forwarding table. However, in other cases, the addition of this entry can be triggered by one or more factors, such as a communication history associated with the destination address, a size of the cache table, a network policy, a restriction, an identity of the destination device, a reply or response received from the destination device, etc.

In addition to, or in lieu of, the entry in the pending learning cache table, the system 110 can create a pending learning entry in the routing table. For example, the system 110 can list the destination address in the routing table and include data or a flag indicating that learning is pending or that learning should be performed.

In response to receiving a second packet from the endpoint device associated with the destination address, the system 110 determines that the destination address is listed in the pending learning cache table (1106). In other words, the system 110 can receive the second packet from the endpoint device and perform a search of the source address in the pending learning cache table to determine if learning is pending for that device.

Based on the second packet, the system 110 identifies a network address of the associated network node (1108). Here, the system 110 can analyze the second packet and extract the network address of the associated network node to create a mapping or binding for the endpoint device in the routing table. The system 110 then modifies the routing table to identify the associated network node for the destination address (1110). The associated network node can include a VTEP, such as a host VTEP; a switch, such as a top-of-rack (TOR) switch; a router; or any network device attached to the endpoint device or configured to deliver traffic to the endpoint device.

In modifying the routing table, the system 110 can create a mapping or binding for the endpoint in the routing table, such as an endpoint to TOR switch binding, for example. Such binding or mapping can allow the system 110 to quickly determine where to forward packets it receives from future communications which are intended for the endpoint device associated with the destination address. Moreover, after modifying the routing table to identify the associated network node, the system 110 can purge or remove the pending learning entry in the pending learning cache table. The system 110 can also purge or remove any pending learning entries that may have been created in the routing table.

In some embodiments, the first packet is received via a first switch residing in a first virtual network associated with the originating device, and the associated network node is a second switch residing in a second virtual network associated with the endpoint device. Here, the first switch can learn about the second switch after receiving a subsequent communication from the endpoint device. The first switch can then create a mapping or binding in the routing table to learn where to forward future packets intended for delivery to the endpoint device.

In some embodiments, a determination that the destination address should be listed in the pending learning cache table or a pending learning entry should be added to the routing table can be performed based on a counting bloom filter. The counting bloom filter can be used to selectively learn endpoint-to-switch bindings to save cost and improve performance. In some cases, a counting bloom filter can be implemented with any number of hash polynomials, such as 4 or 8 hash polynomials, for example, with bit vectors, such as 4096 or 8192, to approximate when an address of an endpoint is to be learned or when such address should not be learned. Further, to facilitate purging out interest after learning has taken place, the interest can be removed by manipulating the bloom filter bits for the address that was previously learned from the overlay traffic.

When modifying the routing table to create mappings or bindings, the system 110 can ignore or avoid learning binding addresses that are unnecessary, or which are not expected to be used by the system 110 in future communications. For example, the system 110 can ignore addresses in a broadcast that are not determined to be intended targets or that never respond to a communication from the system 110.

For clarity of explanation, in some instances the present technology may be presented as including individual functional blocks including functional blocks comprising devices, device components, steps or routines in a method embodied in software, or combinations of hardware and software.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

I claim:

1. A method comprising:
   receiving a first packet directed to an endpoint device in a network, the first packet including a destination address associated with the endpoint device;
   determining that the destination address does not have an associated network node identified in a routing table;
   listing the destination address in a pending learning cache table to yield a pending learning entry; and
   based on the pending learning entry, modifying the routing table to identify a network address of the associated network node for the destination address, wherein modifying the routing table is performed in response to receiving a second packet from the endpoint device, and wherein the network address of the associated network node is identified based on the second packet.

2. The method of claim 1, further comprising, after determining that the destination address does not have the associated network node identified in the routing table, creating a pending learning entry for the destination address in the routing table.

3. The method of claim 2, further comprising purging the pending learning entry in the routing table after modifying the routing table to identify the associated network node.

4. The method of claim 1, wherein modifying the routing table comprises mapping the network address of the associated network node to the destination address.

5. The method of claim 1, wherein the network address of the associated network node is identified by extracting the network address from the second packet in response to a determination that the destination address is listed in the pending learning cache table, wherein the second packet comprises at least one of a response, a broadcast message, or a multicast message sourced by the endpoint associated with the destination address of the first packet.

6. The method of claim 1, wherein the network comprises a virtual extensible local area network, and wherein the first packet is received from an originating device in the virtual extensible local area network.

7. The method of claim 6, wherein the endpoint device resides in a different network segment than the originating device.

8. The method of claim 6, wherein the endpoint device and the originating device reside on different virtual networks.

9. The method of claim 8, wherein the first packet is received via a first switch residing in a first virtual network associated with the originating device, and wherein the associated network node comprises a second switch residing in a second virtual network associated with the endpoint device.

10. The method of claim 1, further comprising, based on a counting bloom filter, determining that the destination address should be listed in the pending learning cache table.

11. A system comprising:
a processor; and
a computer-readable storage device having stored therein instructions which, when executed by the processor, cause the processor to perform operations comprising:
receiving a first packet directed to an endpoint device in a network, the first packet including a destination address associated with the endpoint device;
determining that the destination address does not have an associated network node identified in a routing table;
listing the destination address in a pending learning cache table;
in response to receiving a second packet from the endpoint device associated with the destination address, determining that the destination address is listed in the pending learning cache table;
based on the second packet, identifying a network address of the associated network node; and
modifying the routing table to identify the associated network node for the destination address.

12. The system of claim 11, the computer-readable storage device storing additional instructions which, when executed by the processor, result in an operation further comprising, after determining that the destination address does not have the associated network node identified in the routing table, creating a pending learning entry for the destination address in the routing table.

13. The system of claim 12, the computer-readable storage device storing additional instructions which, when executed by the processor, result in an operation further comprising purging the pending learning entry after modifying the routing table to identify the associated network node.

14. The system of claim 11, wherein modifying the routing table comprises mapping the network address of the associated network node to the destination address.

15. The system of claim 11, wherein identifying the network address of the associated network node comprises extracting the network address from the second packet in response to the determining that the destination address is listed in the pending learning cache table.

16. The system of claim 11, wherein the network comprises a virtual extensible local area network and the first packet is received from an originating device in the virtual extensible local area network, and wherein the first packet is received via a first switch residing in a first virtual network associated with the originating device and the associated network node comprises a second switch residing in a second virtual network associated with the endpoint device.

17. A non-transitory computer-readable storage medium having stored therein instructions which, when executed by a processor, cause the processor to perform operations comprising:
receiving a first packet directed to an endpoint device in a network, the first packet including a destination address associated with the endpoint device;
determining that the destination address does not have an associated network node identified in a routing table;
listing the destination address in a pending learning cache table to yield a pending learning entry; and
based on the pending learning entry, modifying the routing table to identify a network address of the associated network node for the destination address, wherein modifying the routing table is performed in response to receiving a second packet from the endpoint device, and wherein the network address of the associated network node is identified based on the second packet.

18. The non-transitory computer-readable storage medium of claim 17, storing additional instructions which, when executed by the processor, result in operations further comprising:
after determining that the destination address does not have the associated network node identified in the routing table, creating a pending learning entry for the destination address in the routing table; and
purging the pending learning entry in the routing table after modifying the routing table to identify the associated network node.

19. The non-transitory computer-readable storage medium of claim 17, wherein modifying the routing table comprises mapping the network address of the associated network node to the destination address, and wherein the network address of the associated network node is identified by extracting the network address from the second packet in response to a determination that the destination address is listed in the pending learning cache table.

20. The non-transitory computer-readable storage medium of claim 17, wherein the network comprises a virtual extensible local area network and the first packet is received from an originating device in the virtual extensible local area network, and wherein the first packet is received via a first switch residing in a first virtual network associated with the originating device and the associated network node comprises a second switch residing in a second virtual network associated with the endpoint device.

* * * * *